(12) United States Patent
Ozaki et al.

(10) Patent No.: US 7,225,631 B2
(45) Date of Patent: Jun. 5, 2007

(54) AIR CHILLER UNIT

(75) Inventors: Masaji Ozaki, Tokyo (JP); Shuji Maeda, Tokyo (JP)

(73) Assignee: Jamco Corporation, Tokyo (JP)

( * ) Notice: Subject to any disclaimer, the term of this patent is extended or adjusted under 35 U.S.C. 154(b) by 251 days.

(21) Appl. No.: 11/110,865

(22) Filed: Apr. 21, 2005

(65) Prior Publication Data

US 2005/0235674 A1    Oct. 27, 2005

(30) Foreign Application Priority Data

Apr. 26, 2004   (JP) ............................. 2004-129760

(51) Int. Cl.
*F25D 19/00* (2006.01)
(52) U.S. Cl. ...................... 62/295; 248/638; 248/678
(58) Field of Classification Search ........ 248/637–638, 248/674, 676, 678, 346.01; 62/295
See application file for complete search history.

(56) References Cited

U.S. PATENT DOCUMENTS

| | | | |
|---|---|---|---|
| 4,361,014 A | 11/1982 | Blain | |
| 4,461,446 A | 7/1984 | Hannibal et al. | |
| 5,238,215 A * | 8/1993 | Jeker et al. | 248/638 |
| 5,491,979 A | 2/1996 | Kull et al. | |
| 6,170,789 B1 * | 1/2001 | Hayakawa | 248/346.01 |
| 6,260,373 B1 * | 7/2001 | Rockwood | 62/295 |
| 6,912,865 B2 * | 7/2005 | Seo et al. | 62/295 |
| 6,912,866 B2 * | 7/2005 | Seo et al. | 62/295 |
| 2006/0054767 A1 * | 3/2006 | Kemeny | 248/346.01 |

FOREIGN PATENT DOCUMENTS

JP        04-184025        7/1992

OTHER PUBLICATIONS

European Search Report dated Oct. 11, 2006, issued in corresponding European Application No. 05004259.9.

* cited by examiner

*Primary Examiner*—William E. Tapolcai
(74) *Attorney, Agent, or Firm*—Westerman, Hattori, Daniels & Adrian, LLP.

(57) ABSTRACT

The invention provides an improved air chiller unit mounted on an aircraft for sending cooled air to service carts used for serving meals. An air chiller unit 1 includes a refrigeration cycle unit housed in a casing 10. The refrigeration cycle unit comprises a compressor 20, a condenser 30 and an evaporator 40 for a refrigerant, and the cooled air is sent to a galley via a blower device 60. The casing 10 is formed of honeycomb panels. The compressor 20 is supported via a pair of vibration isolation mounting devices 26 on a base plate of the casing 10. The vibration isolation mounting device 26 is formed of a triangular prism-shaped bracket and an A-shaped vibration isolation rubber, which functions to isolate vibration at normal times, and when a large load is received, functions to support the compressor device 20 with high spring constant with the rubber vibration isolator compressed.

2 Claims, 10 Drawing Sheets

AIR CHILLER UNIT

The present application is based on and claims priority of Japanese patent application No. 2004-129760 filed on Apr. 26, 2004, the entire contents of which are hereby incorporated by reference.

BACKGROUND OF THE INVENTION

1. Field of the Invention

The present invention relates to an air chiller unit (air cooling device) equipped in a body of an aircraft for supplying cooled air to foods or the like.

2. Description of the Related Art

Passenger aircrafts that travel long distances, such as international flights, are equipped with service carts storing meals and the like to be served to passengers, and galleys (kitchen areas) housing the service carts for preparing beverages and carrying out easy food preparation.

The meals are cooked in advance in service facilities on the ground, placed on trays to be stored in service carts, and brought on board.

Of the meals placed on the trays, warm dishes are heated using a heater etc., and cold dishes such as salads are maintained at low temperature by cooled air fed into the service carts.

The patent document of U.S. Pat. No. 5,491,979 discloses an example of a device for cooling service carts.

The air chiller unit is disposed in a space provided on the ceiling or under the floor of the galley in the aircraft. The air chiller unit is equipped with a refrigeration cycle unit, which cools air by an evaporator disposed within a cooling air chamber and supplies the cooled air via a duct to the galley or the like.

Since the air chiller unit is mounted on an aircraft, the unit is required to be light weight and small, and since it is located near the passenger seats, the noise generated by the unit must be reduced.

For safety, it is necessary that the air chiller unit maintain durability when it is subjected to a load as large as 9 G. The refrigeration cycle unit incorporated in the air chiller unit has a compressor for a refrigerant, which is a rotary machine, and it is necessary that the compressor is provided with a vibration-isolation supporting mechanism.

In the prior art, the support arrangement sacrificed the vibration isolation performance so as to provide sufficient durability to the 9-G load.

SUMMARY OF THE INVENTION

The present invention provides an air chiller unit having a vibration isolation mounting mechanism for the compressor that has both load endurance property and vibration isolation property.

The air chiller unit according to the present invention comprises a refrigeration cycle unit, a casing for housing the refrigeration cycle unit, and a pair of vibration isolation mounting devices for mounting a refrigerant compressor of the refrigeration cycle unit on the casing, the pair of vibration isolation mounting devices equipped with A-shaped vibration isolation members arranged so that peak portions thereof oppose one another.

Further, the vibration isolation mounting device comprises a triangular prism-shaped bracket, a vibration isolation member having an A-shaped cross-section disposed within the bracket, a cylindrical vibration isolation member disposed on an upper surface of the bracket, and a amounting bolt passing through said vibration isolation members.

As described, the present air chiller unit utilizes a pair of vibration isolation mounting devices as devices for mounting the compressor constituting the refrigeration cycle unit on a base plate of the casing, in which each vibration isolation mounting member is equipped with an A-shaped rubber vibration isolator.

The A-shaped rubber vibration isolator is disposed within a triangular prism-shaped bracket and supports the compressor.

The rubber vibration isolator with an A-shaped cross-section is basically soft, exhibiting advantageous absorption property to fine vibrations, but it cannot endure the application of large loads.

Therefore, the present invention adopts a structure in which two rubber vibration isolators with the A-shaped cross-section are arranged so that their peak portions (upper ends) face each other, with the periphery of the rubber vibration isolators surrounded with triangular prism-shaped brackets.

Therefore, when a large horizontal load is applied, the rubber vibration isolator with an A-shaped cross-section is pushed into the bracket and compressed, according to which the spring constant is increased significantly. By this action, the rubber vibration isolator disposed on the side being compressed can endure large loads.

The rubber vibration isolator that is disposed on the side not being compressed maintains its vibration absorption property, with the leg portions of the A-shaped rubber capable of deforming easily.

According to this arrangement, the vibration isolator can exhibit a good vibration isolation property for even a large rotational torque applied when the compressor is started or stopped.

DETAILED DESCRIPTION OF THE PREFERRED EMBODIMENTS

Figure 1:
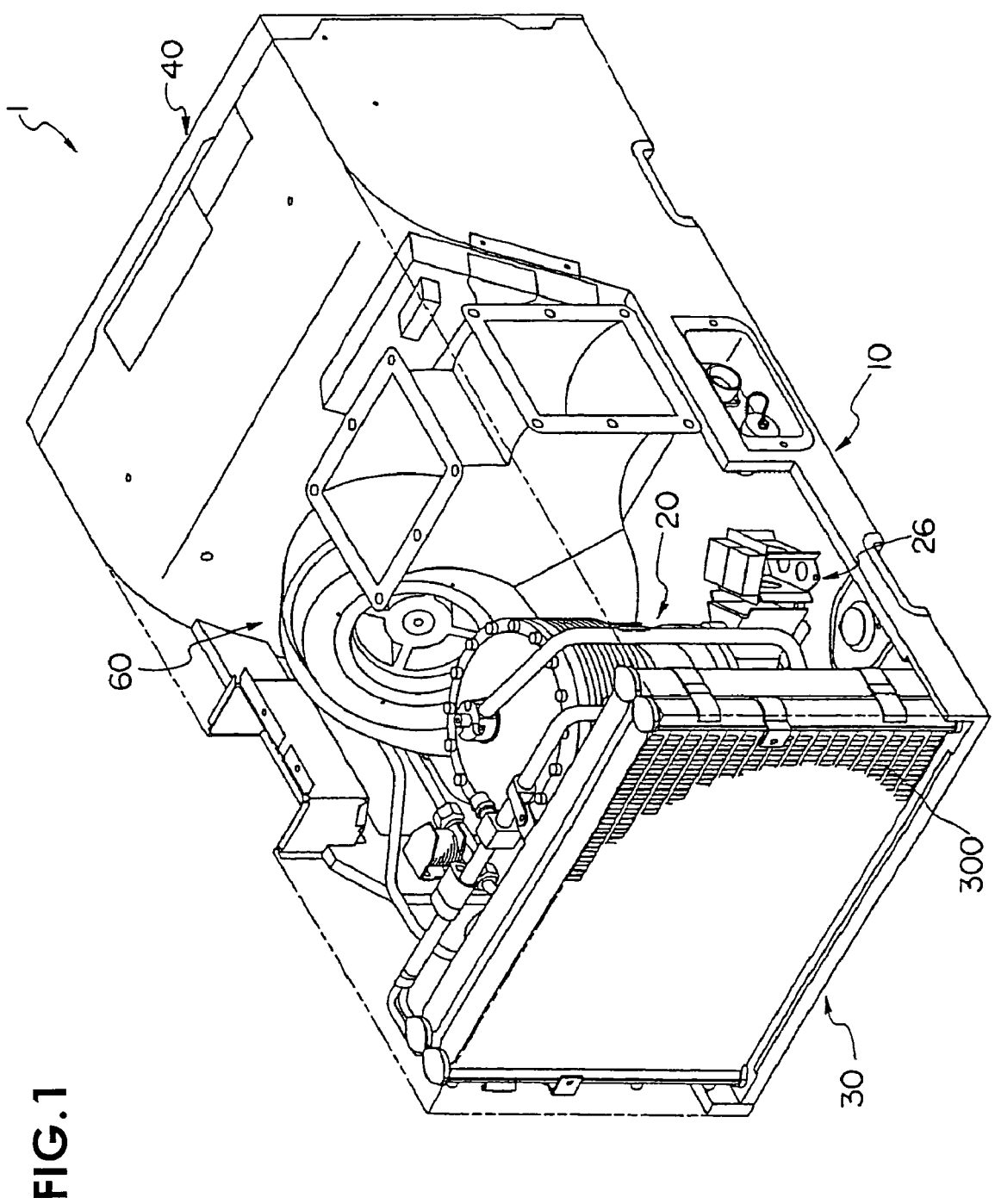
FIG. 1 is an explanatory view of an air chiller unit according to the present invention.
Figure 2:
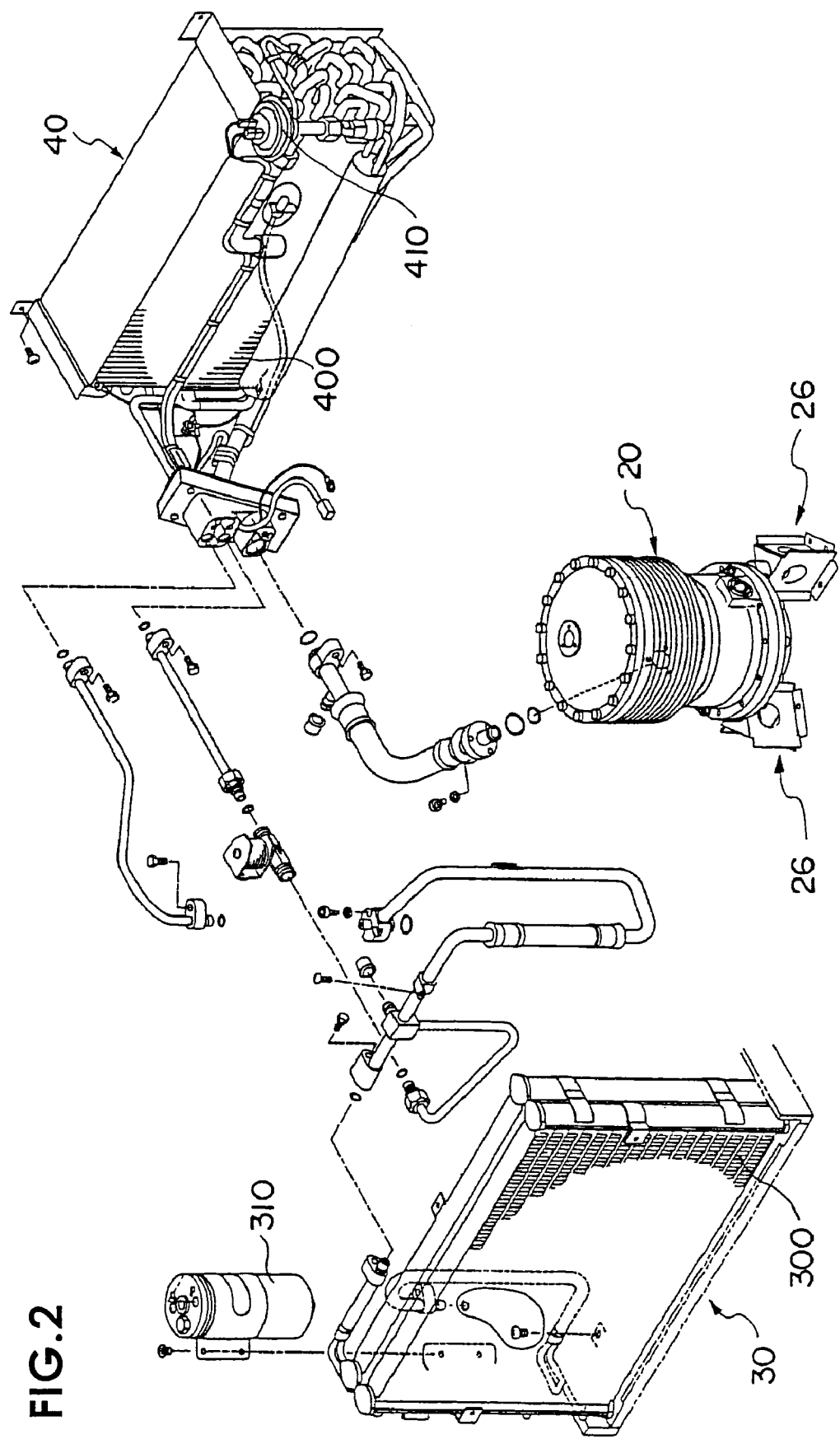
FIG. 2 is an explanatory view of a refrigeration cycle unit of the air chiller unit according to the present invention.

FIGS. 1 and 2 are explanatory views showing the appearance of the air chiller unit according to the present invention, and the general structure of the refrigeration cycle unit thereof.

An air chiller unit referred to as a whole by reference number 1 is equipped with a casing 10, a compressor 20 for a refrigerant disposed within the casing 10, a condenser 30, an evaporator 40 and a blower device 60 for blowing air. The compressor 20, which is a rotary machine, is mounted on a base plate of the casing 10 via a vibration isolation mounting device 26 according to the present invention.

As illustrated in FIG. 2, the refrigeration cycle unit of the air chiller unit is equipped with a compressor 20 driven by a motor, for compressing the refrigerant and sending out the same toward the condenser 30. The condenser 30 is equipped with a heat exchanger 300 for exchanging the gaseous refrigerant to a liquid-phase refrigerant. The liquid-phase refrigerant is stored in a receiver drier 310 disposed adjacent to the heat exchanger. The liquid-phase refrigerant in the receiver drier 310 is sent via a piping to an evaporator 40 disposed within the air cooling chamber defined by the wall of the casing 10. The liquid-phase refrigerant travels through an expansion valve 410 equipped to the evaporator 40 and sent to a heat exchanger 400 of the evaporator. The refrigerant is evaporated in the heat exchanger 400 and cools the air passing the heat exchanger 400.

The expansion valve 410 changes the opening of the valve according to the pressure and temperature of the refrigerant returning toward the compressor 20 from the evaporator 40, to thereby control the flow rate of the refrigerant being sent to the evaporator.

The blower device 60 has two fans mounted on both ends of a shaft of a motor, and blows air toward the condenser 30 and also blows the cooled air generated in the air cooling chamber toward the service carts placed in the galley of the passenger cabin.

Figure 3:
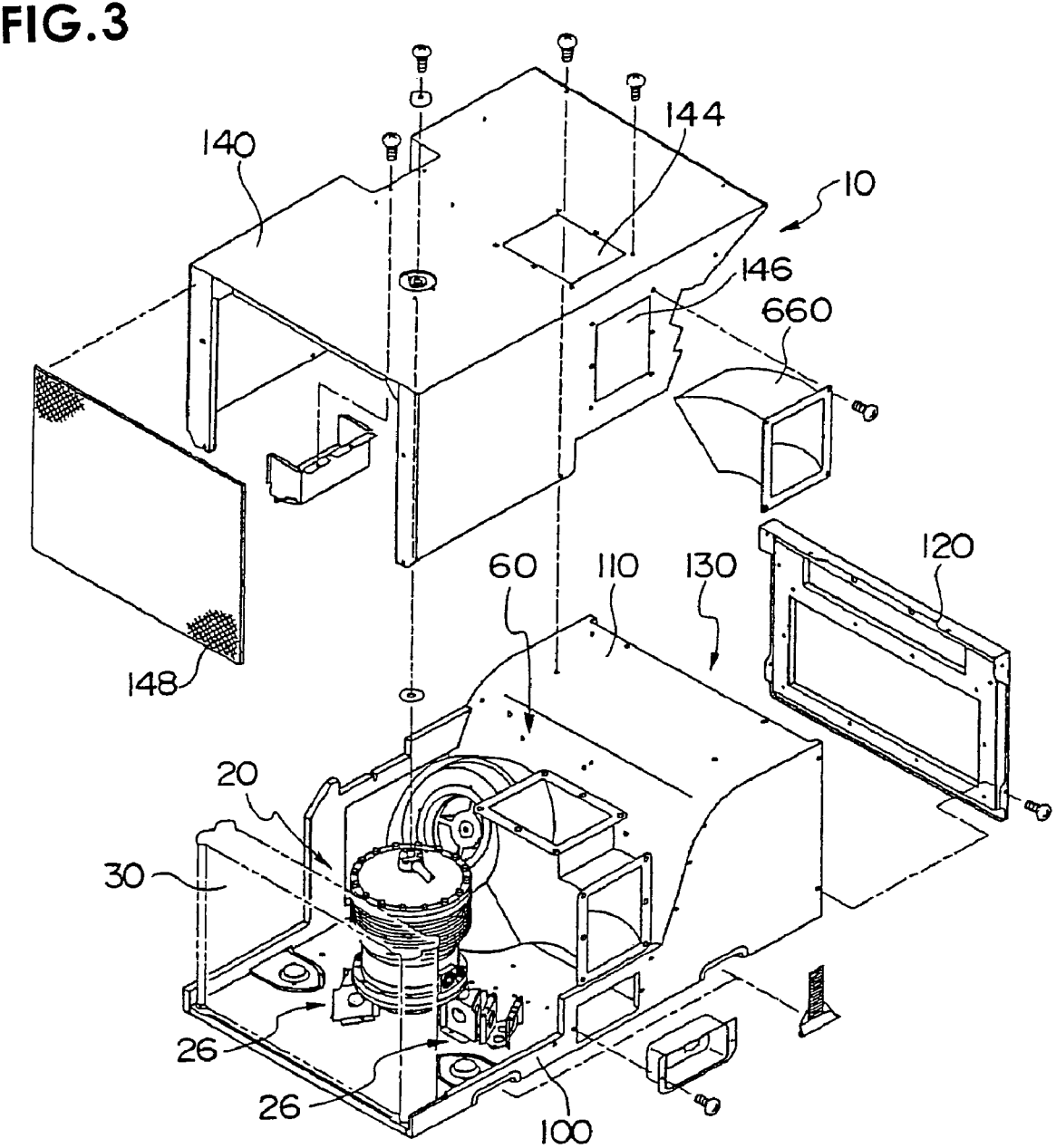
FIG. 3 is an explanatory view showing the structure of a casing of the air chiller unit according to the present invention.
Figure 4:
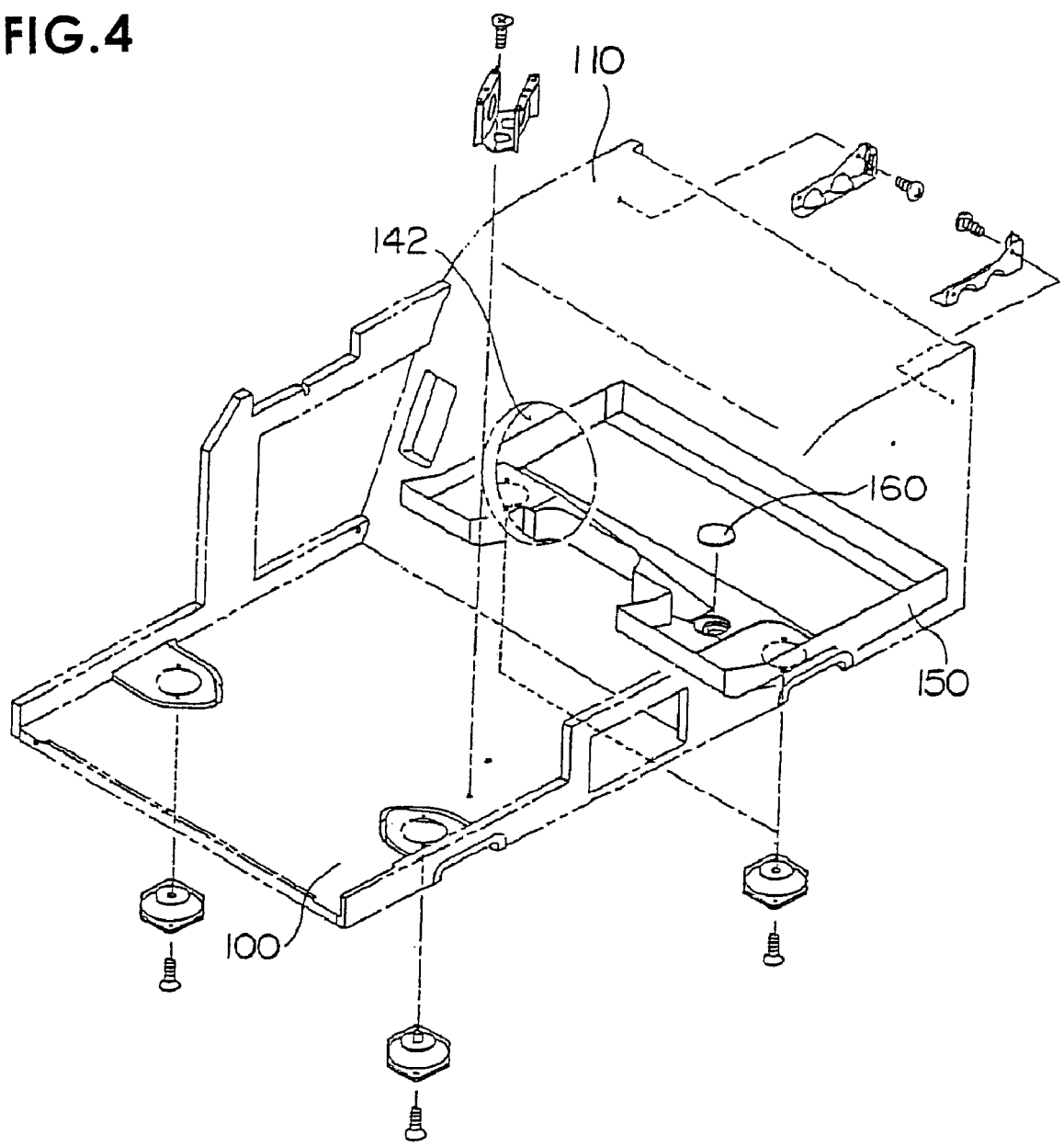
FIG. 4 is an explanatory view showing the structure of a casing of the air chiller unit according to the present invention.

FIGS. 3 and 4 are explanatory views showing the structure of a casing of the air chiller unit according to the present invention.

The casing 10 comprises a base plate 100, and on the base plate 100 are mounted devices such as the compressor 20.

The base plate 100 is formed of a honeycomb panel manufactured by sandwiching a core member having a honeycomb structure between two parallel plate members.

The honeycomb panel is lightweight and has superior flexural rigidity, so the base plate 100 is capable of supporting devices such as the compressor 20 by itself.

Since the honeycomb panel is formed to have air sealed in the honeycomb core, it has high heat insulating property. Therefore, it is suitable for forming the air cooling chamber or the like.

A partition member 110 formed of a honeycomb panel is disposed on the base plate 100. This partition member 110 is for dividing the air chiller unit into a side having the condenser and a side having the evaporator, and on this partition member 110 is mounted the blower device 60.

The partition member constitutes a portion of the air cooling chamber 130. A lid member 120 is mounted on the opening of the partition member 110.

A cover member 140 is mounted above the base plate 100, by which the compressor 20 and the blower device 60 are covered. The cover member 140 has rectangular openings 144 and 146 on the upper surface and side surface thereof. The openings 144 and 146 are for attaching a duct for sending cooled air to the galley, wherein only one of the two openings will be used.

A mesh member 148 is attached to the end of the cover member 140, by which the front face of the condenser 30 is covered.

As illustrated in FIG. 4, a round hole 142 for the blower device is formed to the partition member 110. Further, a drain pan 150 for receiving water drops condensed on the evaporator is attached to the bottom of the air cooling chamber. The drain pan 150 is equipped with a drain valve 160.

Figure 5:
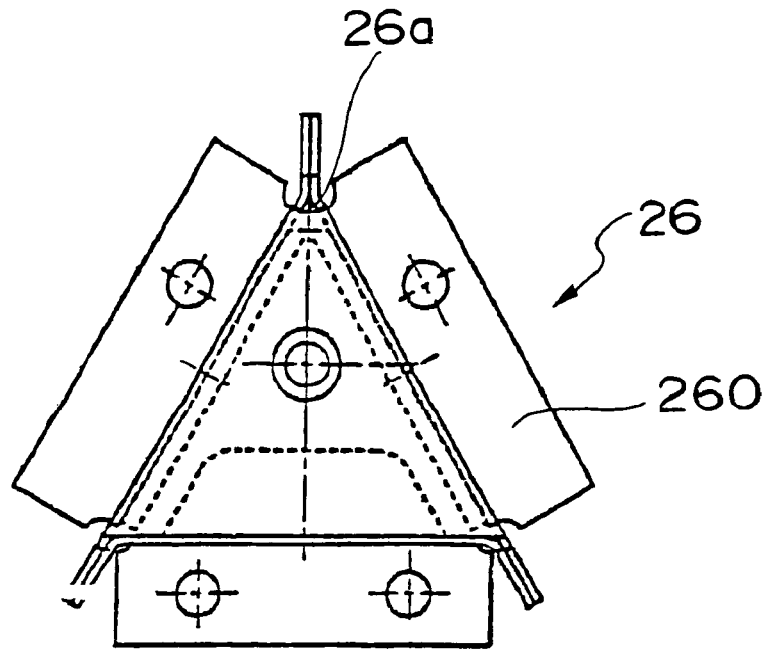
FIGS. 5(a) and 5(b) are explanatory views showing the structure of a vibration isolation mounting device of the air chiller unit according to the present invention.
Figure 5:
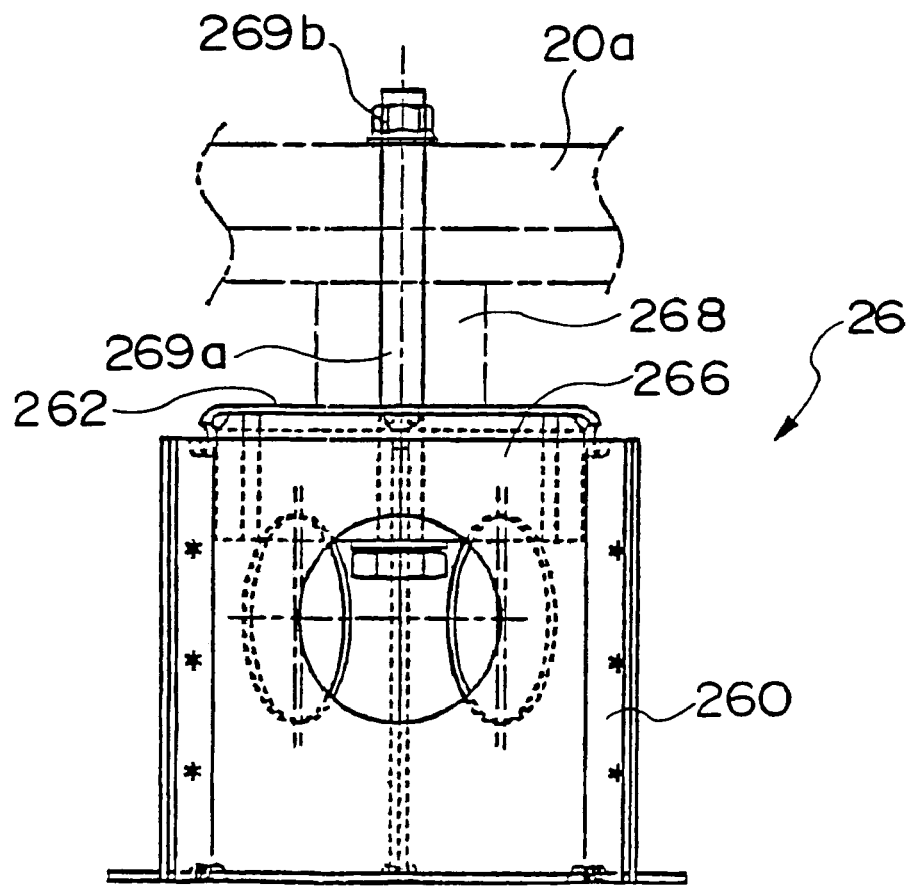

FIG. 5 shows the vibration isolation mounting device 26 of the present invention, wherein FIG. 5(a) is a plan view and FIG. 5(b) is a front view thereof.

The vibration isolation mounting device 26 has a triangular prism-shaped bracket 260, and the bracket 260 is equipped with a ceiling plate 262. A cylindrical second vibration isolation member 268 is disposed above the triangular prism-shaped first vibration isolation member 266 with the ceiling plate 262 interposed therebetween, and a mounting bracket 20a of the compressor is attached to the base plate of the casing via a bolt 269a and a nut 269b passing therethrough.

Figure 6:
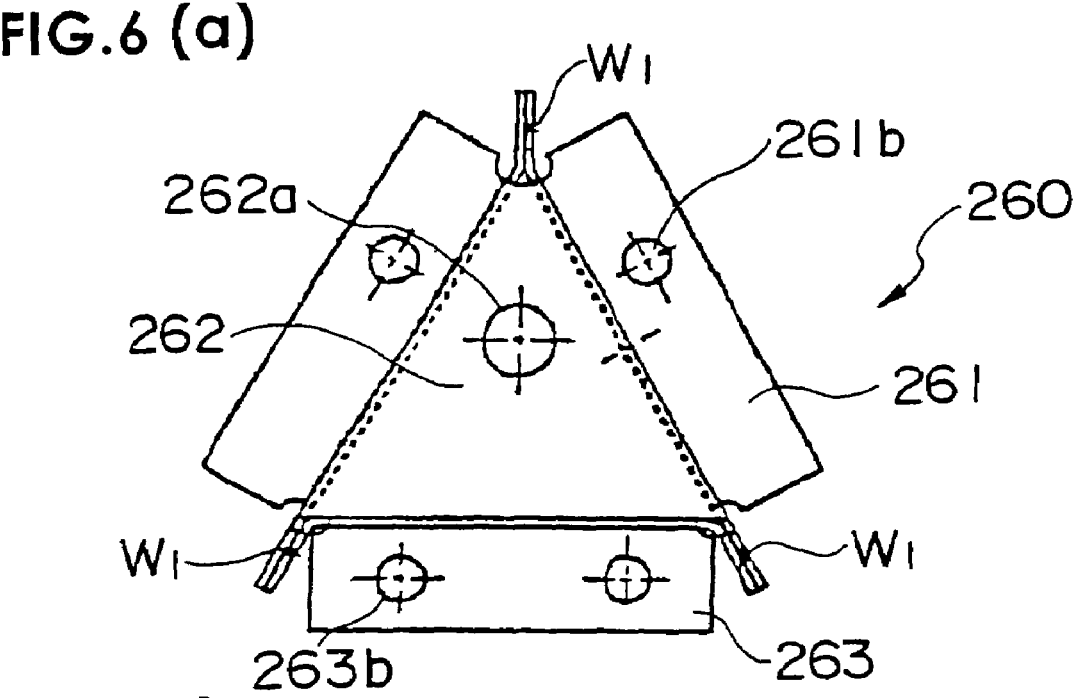
FIGS. 6(a) and 6(b) are explanatory views showing a bracket of the vibration isolation mounting device.
Figure 6:
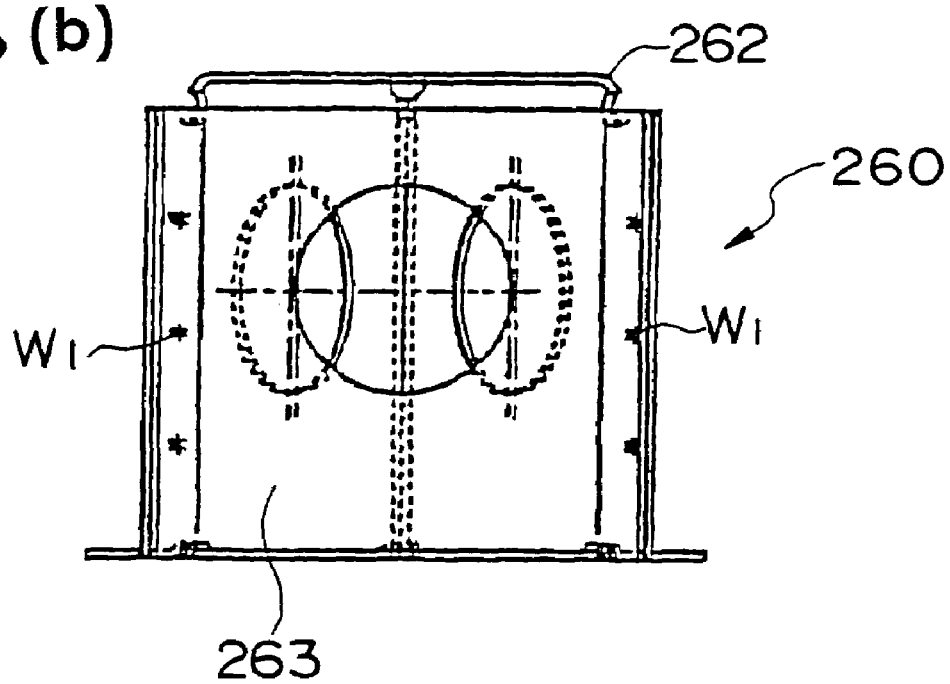

FIG. 6 shows the overall structure of the bracket 260, wherein FIG. 6(a) is a plan view and FIG. 6(b) is a front view thereof.

The triangular prism-shaped bracket 260 is composed of a first bracket member 261 defining two surfaces of the triangular prism and a second bracket member 263 defining the remaining one surface thereof.

The members are formed by bending a metal plate and joined by spot welding $W_1$ at the joint portion.

The members 261 and 263 are provided with screw holes 261b and 263b used for attaching the same to the base plate of the casing, and the ceiling plate is provided with a bolt hole 262a for the bolt to pass through.

Figure 7:
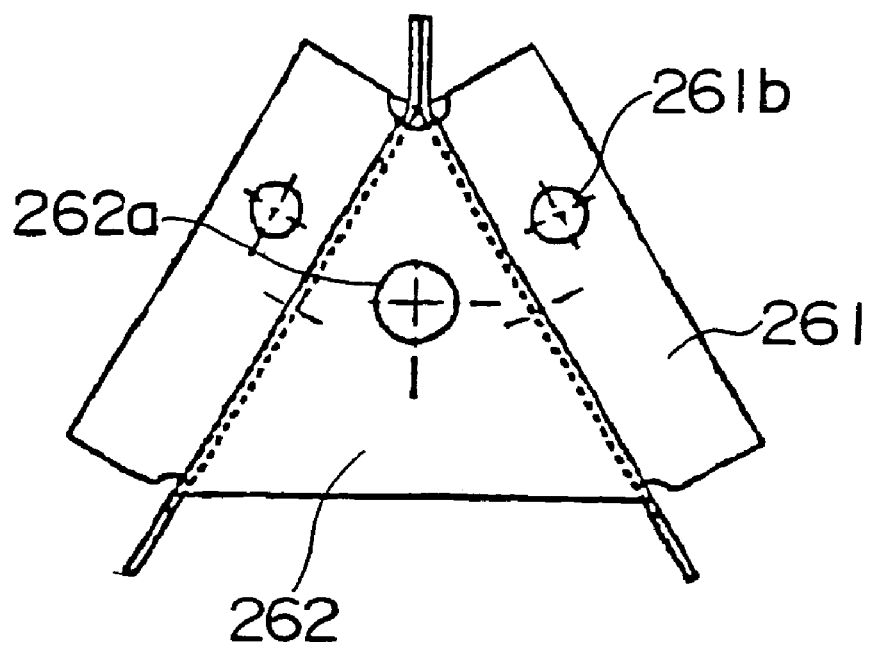
FIGS. 7(a) and 7(b) are explanatory views showing a first bracket member.
Figure 7:
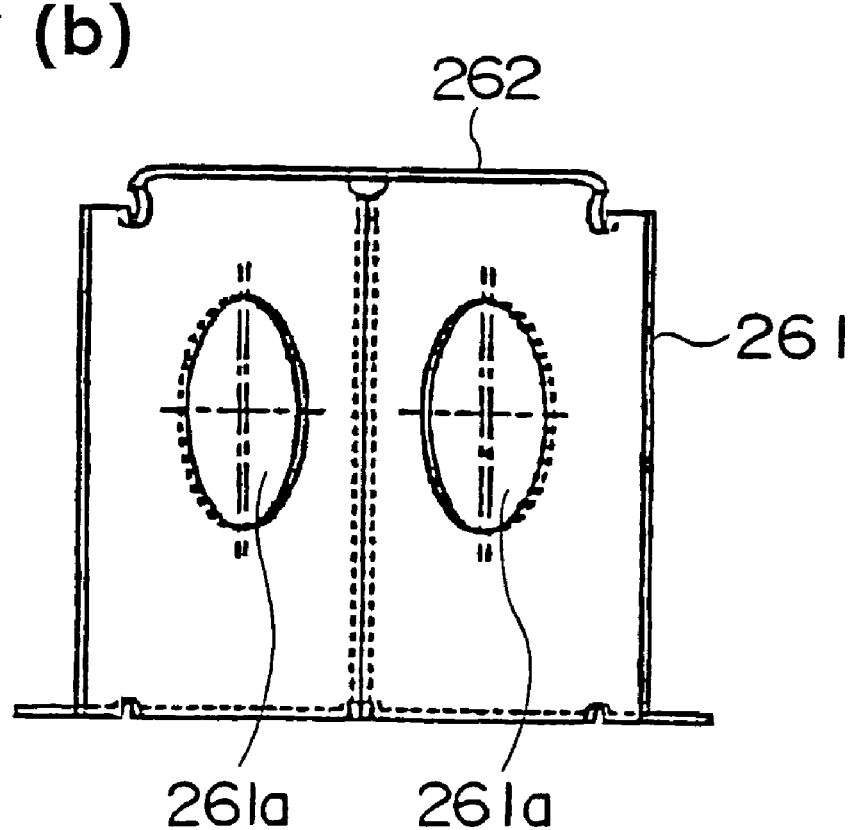

FIG. 7 shows the structure of the first bracket member 261, wherein FIG. 7(a) is a plan view and FIG. 7(b) is a front view thereof.

The first bracket member 261 is formed by bending a metal plate, and has a ceiling plate 262. The two wall faces of the triangular prism are provided with openings 261a for reducing the weight thereof.

Figure 8:
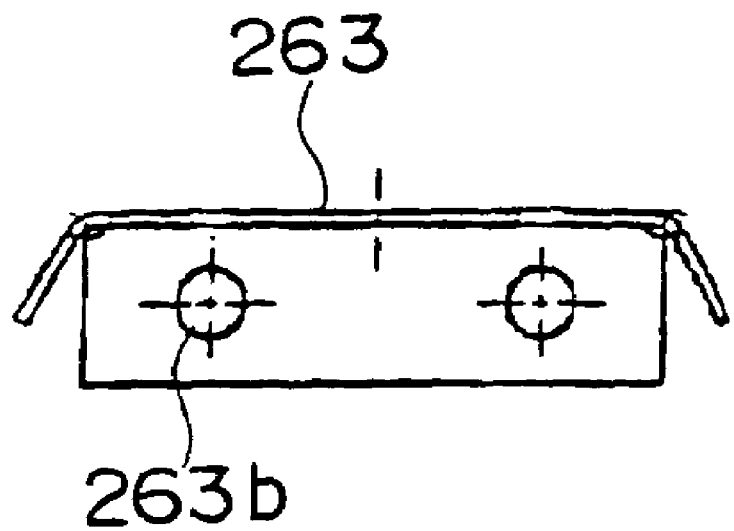
FIGS. 8(a) and 8(b) are explanatory views showing a second bracket member.
Figure 8:
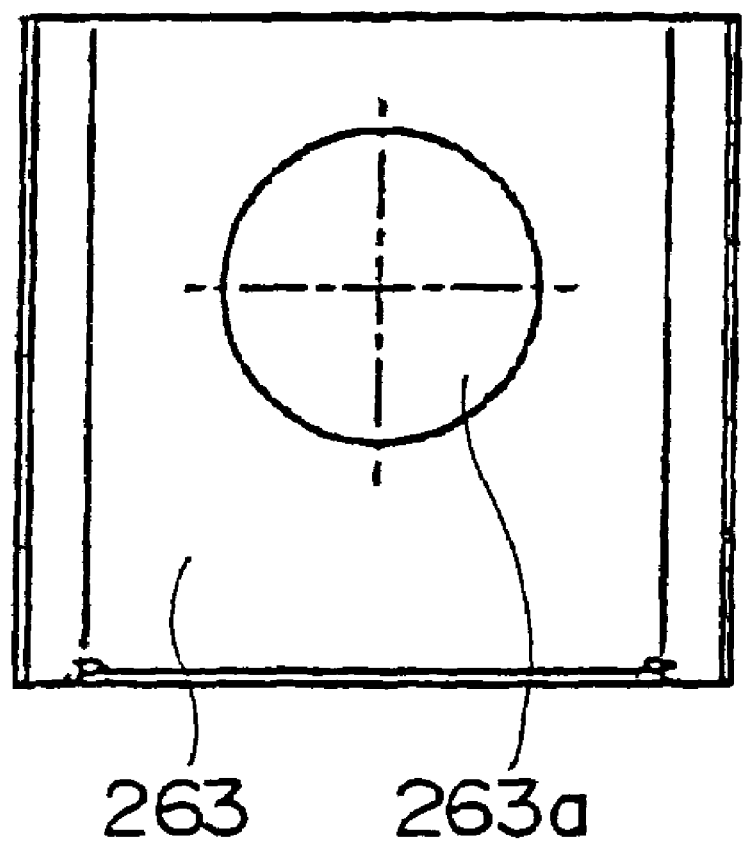

FIG. 8 shows the structure of the second bracket member 263, wherein FIG. 8(a) is a plan view and FIG. 8(b) is a front view thereof.

The second bracket member 263 is formed by bending a metal plate, provided with screw holes 263b and an opening 263a for reducing the weight thereof.

Figure 9:
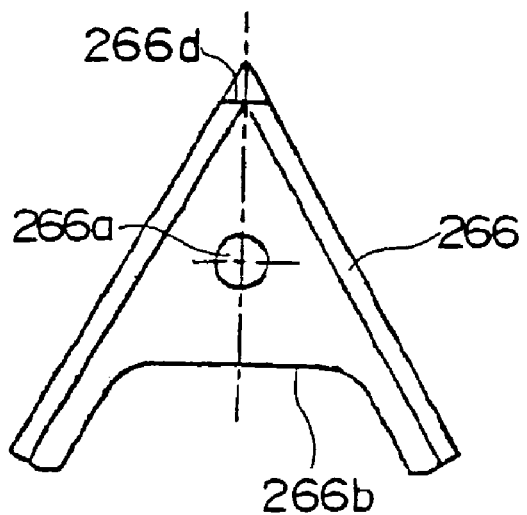
FIGS. 9(a), 9(b), and 9(c) are explanatory views showing a first vibration isolation member.
Figure 9:
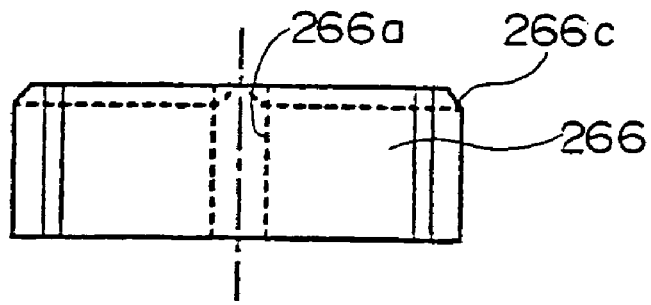
Figure 9:
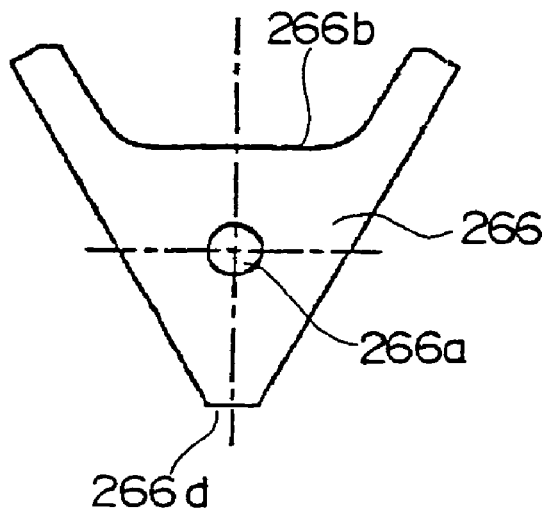

FIG. 9 shows the first vibration isolation member 266, wherein FIG. 9(a) is an upper view, FIG. 9(b) is a front view and FIG. 9(c) is a bottom view thereof.

The first vibration isolation member 266 is formed of an elastic member such as rubber, and shaped so that a recessed portion 266b is formed on one wall of a triangular prism. In other words, the first vibration isolation member has a cross-sectional shape that looks like the letter A of the alphabet Further, the surface coming into contact with the ceiling plate of the bracket is formed to have a chamfered portion 266c.

A bolt hole 266a for allowing a mounting bolt to be passed through is formed at a position close to a peak portion 266d of the fist vibration isolation member having the substantially A-shaped planar shape. The peak portion 266d is formed as a flat surface. Two vibration isolation mounting devices 26 are used as a pair to support the compressor, and the peak portions 266d of the devices are arranged to oppose one another.

Figure 10:
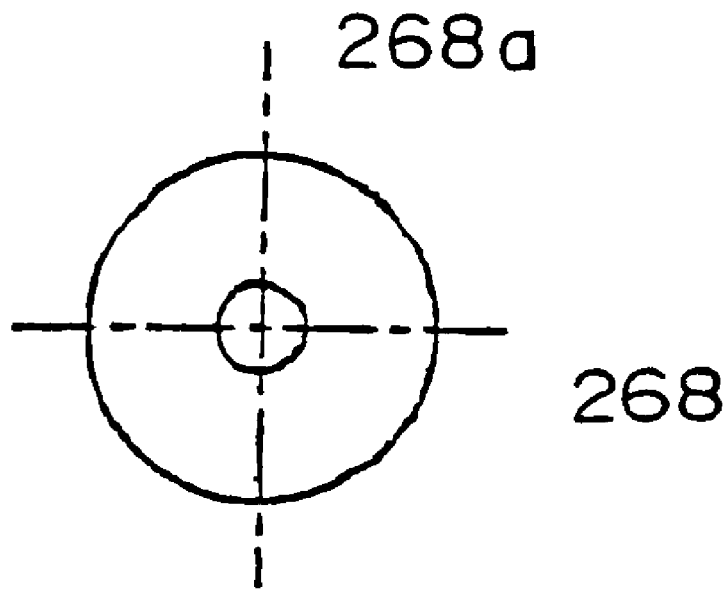
FIGS. 10(a) and 10(b) are explanatory views showing a second vibration isolation member.
Figure 10:
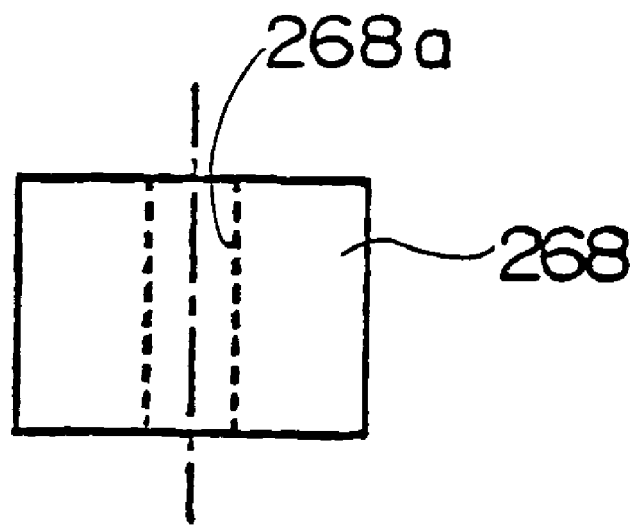

FIG. 10 shows the second vibration isolation member, wherein FIG. 10(a) is a plan view and FIG. 10(b) is a front view thereof.

The second vibration isolation member 268 is formed of an elastic member such as rubber, designed to have a bolt hole 268a formed at a center of a cylindrical member.

According to this structure, as described earlier, the present invention enables to provide an air chiller unit equipped with a compressor mounting device capable of enduring a large load while exhibiting a sufficient vibration isolation performance.

What is claimed is:

1. An air chiller unit equipped in an aircraft for supplying cooled air to a storage portion for storing food, the air chiller unit comprising:
   a refrigeration cycle unit;
   a casing for housing the refrigeration cycle unit; and
   a pair of vibration isolation mounting devices for mounting a refrigerant compressor of the refrigeration cycle unit on the casing, the pair of vibration isolation mounting devices equipped with A-shaped vibration isolation members arranged so that peak portions thereof oppose one another.

2. The air chiller unit according to claim 1, wherein the vibration isolation mounting device comprises a triangular prism-shaped bracket, a vibration isolation member having an A-shaped cross-section disposed within the bracket, a cylindrical vibration isolation member disposed on an upper surface of the bracket, and amounting bolt passing through said vibration isolation members.

* * * * *